(12) United States Patent
Paradis et al.

(10) Patent No.: US 11,092,513 B1
(45) Date of Patent: Aug. 17, 2021

(54) OTDR CALIBRATION METHOD USING MULTIPLE LEVELS OF INTERNAL OPTICAL FIBER BACKSCATTER

(71) Applicant: JGR Optics Inc., Ottawa (CA)

(72) Inventors: Guillaume Paradis, Ottawa (CA); Ryan Jeffrey Veenkamp, Ottawa (CA)

(73) Assignee: JGR Optics inc., Ottawa (CA)

( * ) Notice: Subject to any disclaimer, the term of this patent is extended or adjusted under 35 U.S.C. 154(b) by 0 days.

(21) Appl. No.: 16/791,574

(22) Filed: Feb. 14, 2020

(51) Int. Cl.
*G01M 11/00* (2006.01)

(52) U.S. Cl.
CPC .................. *G01M 11/3109* (2013.01)

(58) Field of Classification Search
CPC .................................................. G01M 11/3109
See application file for complete search history.

(56) References Cited

U.S. PATENT DOCUMENTS

| | | | | |
|---|---|---|---|---|
| 4,685,799 A | * | 8/1987 | Brininstool | G01M 11/335 356/73.1 |
| 5,754,284 A | * | 5/1998 | Leblanc | G01M 11/3109 356/73.1 |
| 2005/0259242 A1 | * | 11/2005 | Bridge | G01M 11/3109 356/73.1 |
| 2014/0198311 A1 | * | 7/2014 | L'Heureux | G01M 11/3118 356/73.1 |

* cited by examiner

*Primary Examiner* — Dominic J Bologna

(57) ABSTRACT

This patent describes an approach to Optical Time-Domain Reflectometer (OTDR) calibration which depends on different levels of backscatter internally produced by the different pulsewidths available to the OTDR. The different pulsewidths available on the OTDR were used to produce traces with different backscatter levels (also called injection levels). The height difference between those levels and the level of the measurement pulsewidth was recorded and matched with the computed Return Loss associated to the pulsewidths length difference. A calibration curve is produced using multiple calibration points.

3 Claims, 5 Drawing Sheets

OTDR CALIBRATION METHOD USING MULTIPLE LEVELS OF INTERNAL OPTICAL FIBER BACKSCATTER

TECHNICAL FIELD

This process relates to Optical Time-Domain Reflectometers such as are used for characterization and testing of fiber optics cables or cable assemblies.

BACKGROUND ART

Long and short-range fiber-optic telecommunication networks are critical for supporting the ever increasing bandwidth requirements of the Internet. The performance and reliability of such networks are highly dependent on the quality of cable assemblies of which they are comprised. Any amount of reflected light toward the source can deteriorate the quality of the signal and increase the signal-to-noise ratio. Therefore, cable assemblies need to be produced with the lowest amount of Return Loss (RL). Multiple methods exist to measure RL; however this patent focuses on OTDR technology and how to properly calibrate its RL measurements. OTDR meters work by using lasers 10/1 to 10/N to produce a short square pulse of intense light down the device under test (DUT) and a photodetector 12 looks at the signal sent back (FIG. 1). The timing of the photodetector's 12 readings is then converted to a distance from the source and is displayed to the user as a trace of amplitude versus distance. Fresnel reflections, arising from discontinuities in the cable assembly (usually connectors or breaks in the fiber), create peaks raising above the level of the light coming back created by Rayleigh backscattering in the fiber. The height of the peak above the backscatter level is used to calculate the RL from that discontinuity.

This patent describes a novel method of Return Loss calibration which relies on an intrinsic, measurable quantity of optical fiber, the backscatter coefficient ($B_{ns}$). This procedure allows for a Return Loss calibration independent of an external artifact which can be easily performed outside of a laboratory environment. Typical OTDRs either use the difference in height between an internal RL reference and a reflective event, as described in U.S. Pat. No. 5,754,284 (Leblanc et al.), issued May 19, 1998, or use Eqn. (1) to calculate RL from a peak above the backscatter level on the OTDR trace (International Standard IEC 61746-1, 2009). Eqn. (1) is derived in "Troubleshooting Optical-fiber Networks, Chapter 7, Elsevier Academic Press, 2$^{nd}$ edition, 2004".

$$R = B_{ns} - 10\log_{10}\left(\left(10^{\frac{H}{5}} - 1\right)W\right) \quad (1)$$

Both methods produce a response curve that is mostly linear for RL higher 60 dB (In our case, a higher RL value means an actual smaller number. For example: 50 dB is higher RL than 60 dB. This comes from the fact that the higher the number, the less light is coming back as RL). However, they both become highly non-linear once you get to very low RL. Usual calibration procedures rely on a single adjustment point to offset the whole curve. Instead, we propose a calibration process that uses multiple points for the adjustment of the RL curve in its non-linear part.

SUMMARY OF THE INVENTION

This patent describes an approach to Optical Time-Domain Reflectometer (OTDR) calibration which depends on different levels of backscatter internally produced by the different pulsewidths available to the OTDR. The different pulsewidths available on the OTDR were used to produce traces with different backscatter levels (also called injection levels). The height difference between those levels and the level of the measurement pulsewidth was recorded and matched with the computed Return Loss associated to the pulsewidths length difference. A calibration curve is produced using multiple calibration points.

DETAILED DESCRIPTION OF THE INVENTION

The first part of the calibration procedure consists of using different pulsewidths with the OTDR to produce injection levels of increasing amplitude with respect to the measurement pulsewidth ($D_m$).

Figure 4:
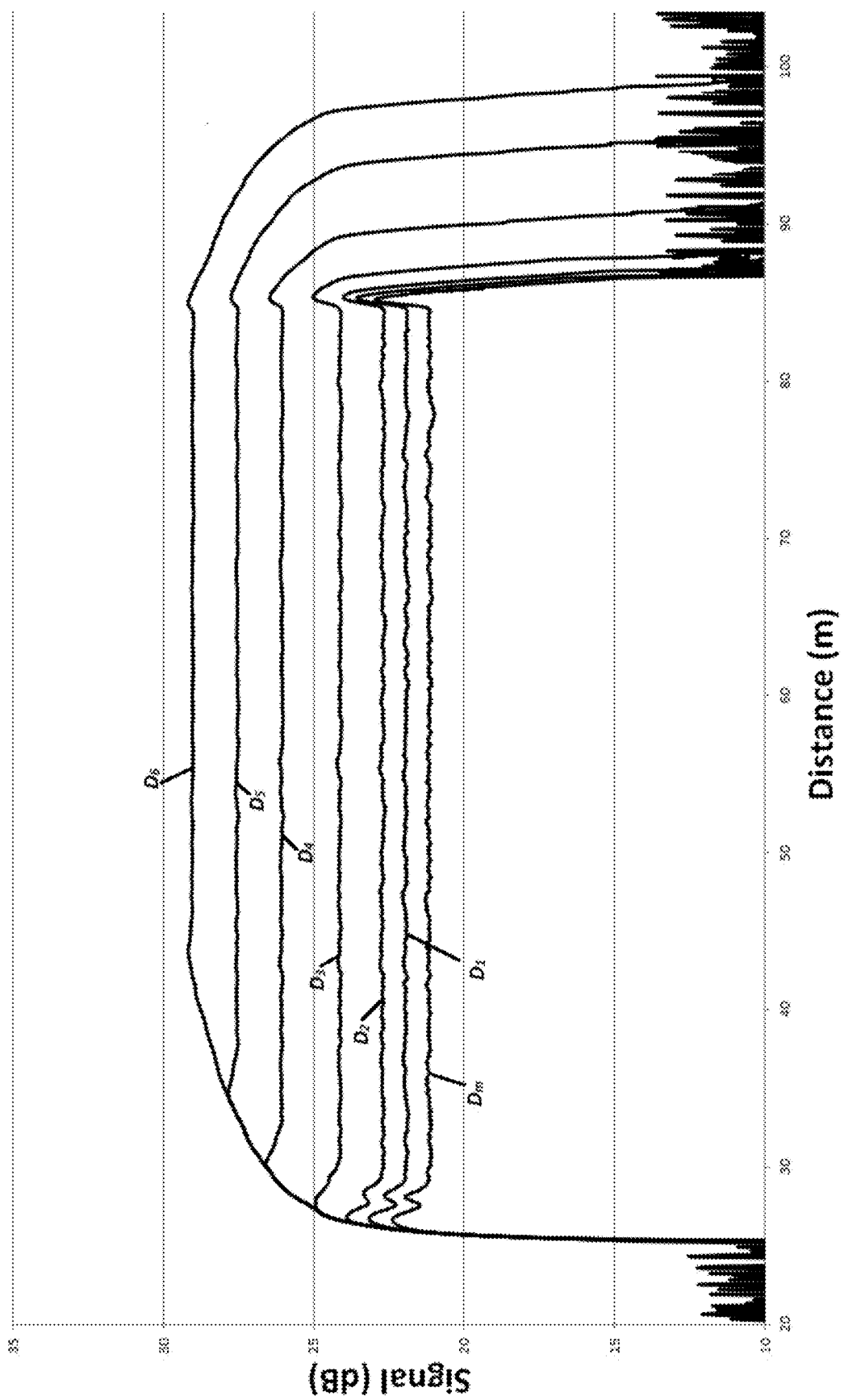
FIG. 4 is an example of many OTDR traces produced by different pulsewidths $D_i$.
Figure 5:
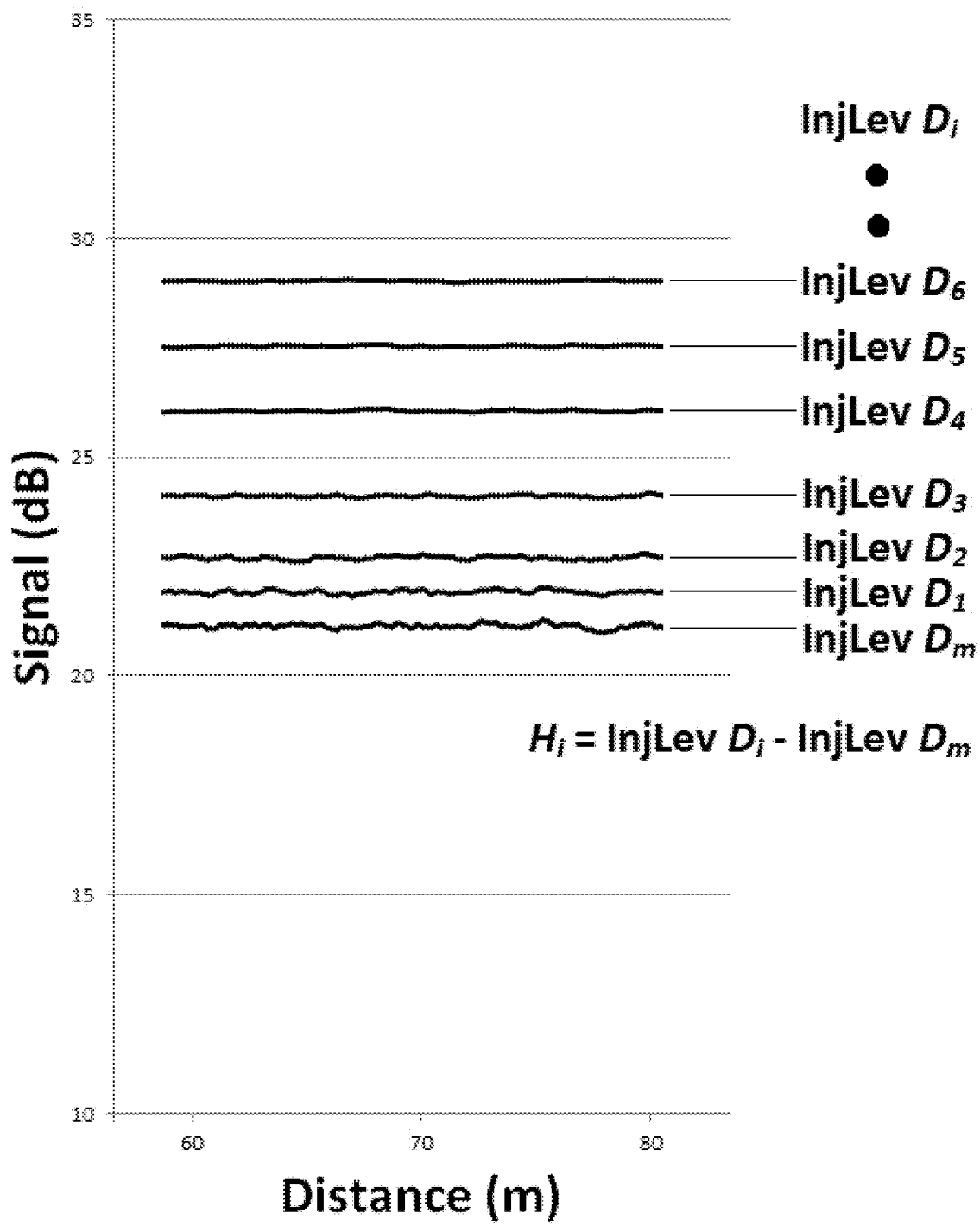
FIG. 5 is a zoomed in area of the traces of FIG. 4 illustrating how $H_i$ are calculated

1. Set the OTDR pulsewidth to $D_m$.
2. Capture an OTDR trace and measure the backscatter level of a sufficiently long spool of optical fiber located inside the instrument 14.
3. Repeat the above step for several increasingly large pulsewidths ($D_i$) (FIG. 4).
4. The difference in height $H_i$ between the backscatter levels generated by 14 for each $D_i$ with respect to the level generated by $D_m$ is recorded (FIG. 5).

Figure 1:
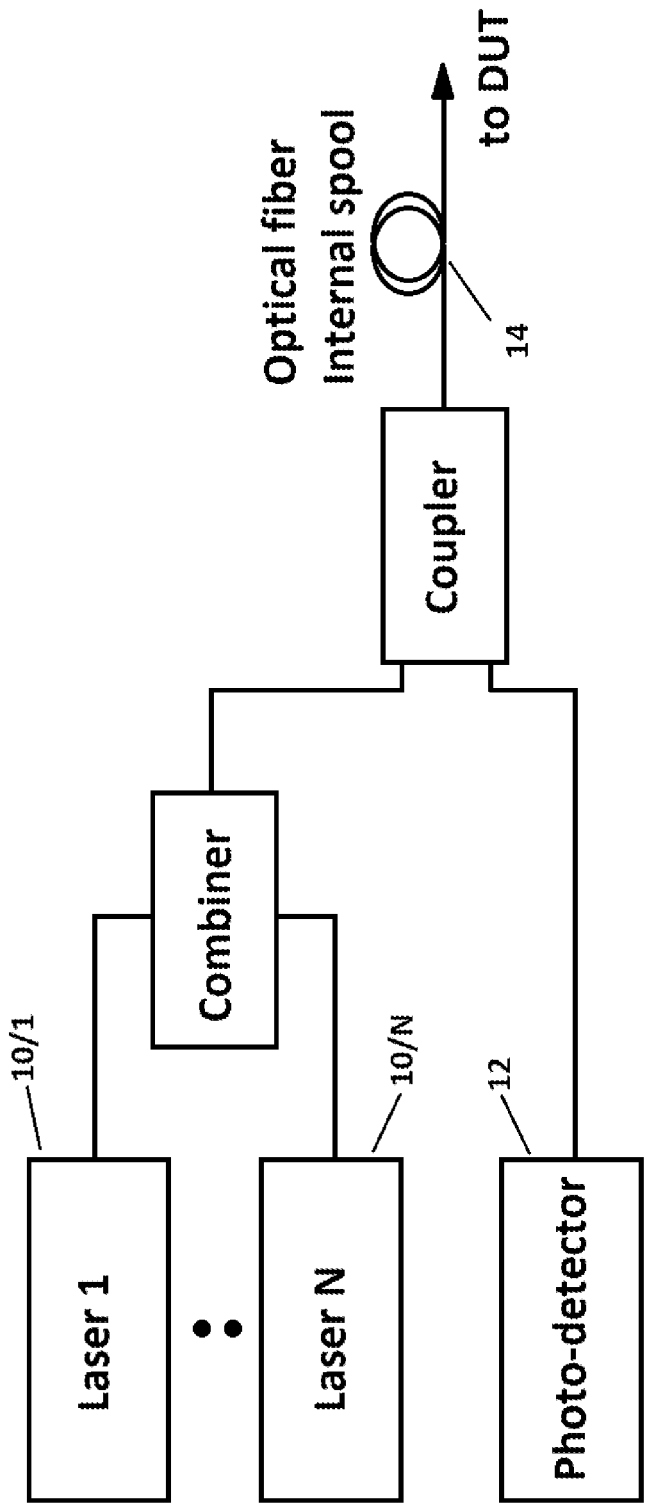
FIG. 1 is a schematic diagram of the internal preferred fiber layout needed to perform the calibration procedure.
Figure 2:
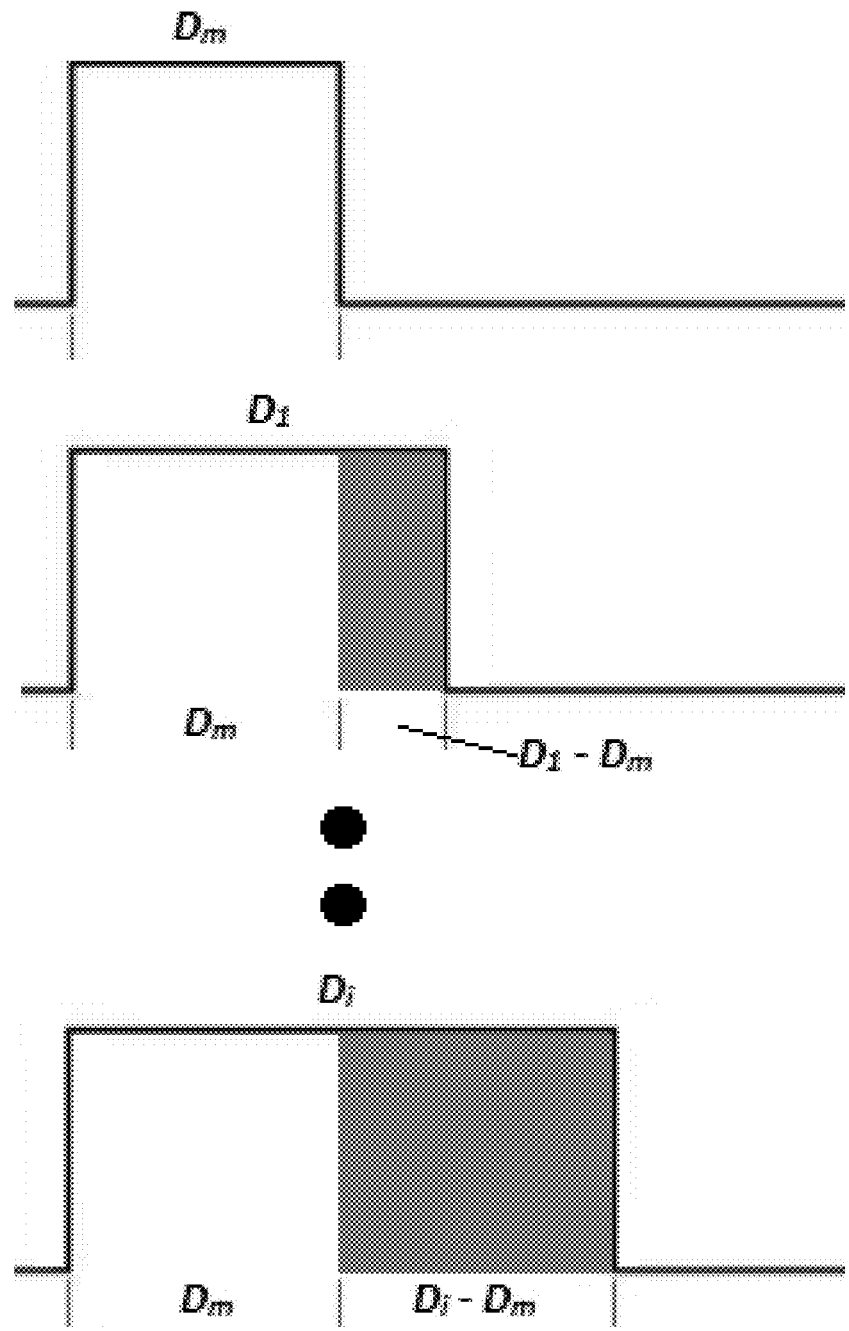
FIG. 2 is a graphical representation of the meaning of the H value between different backscatter levels.
Figure 3:
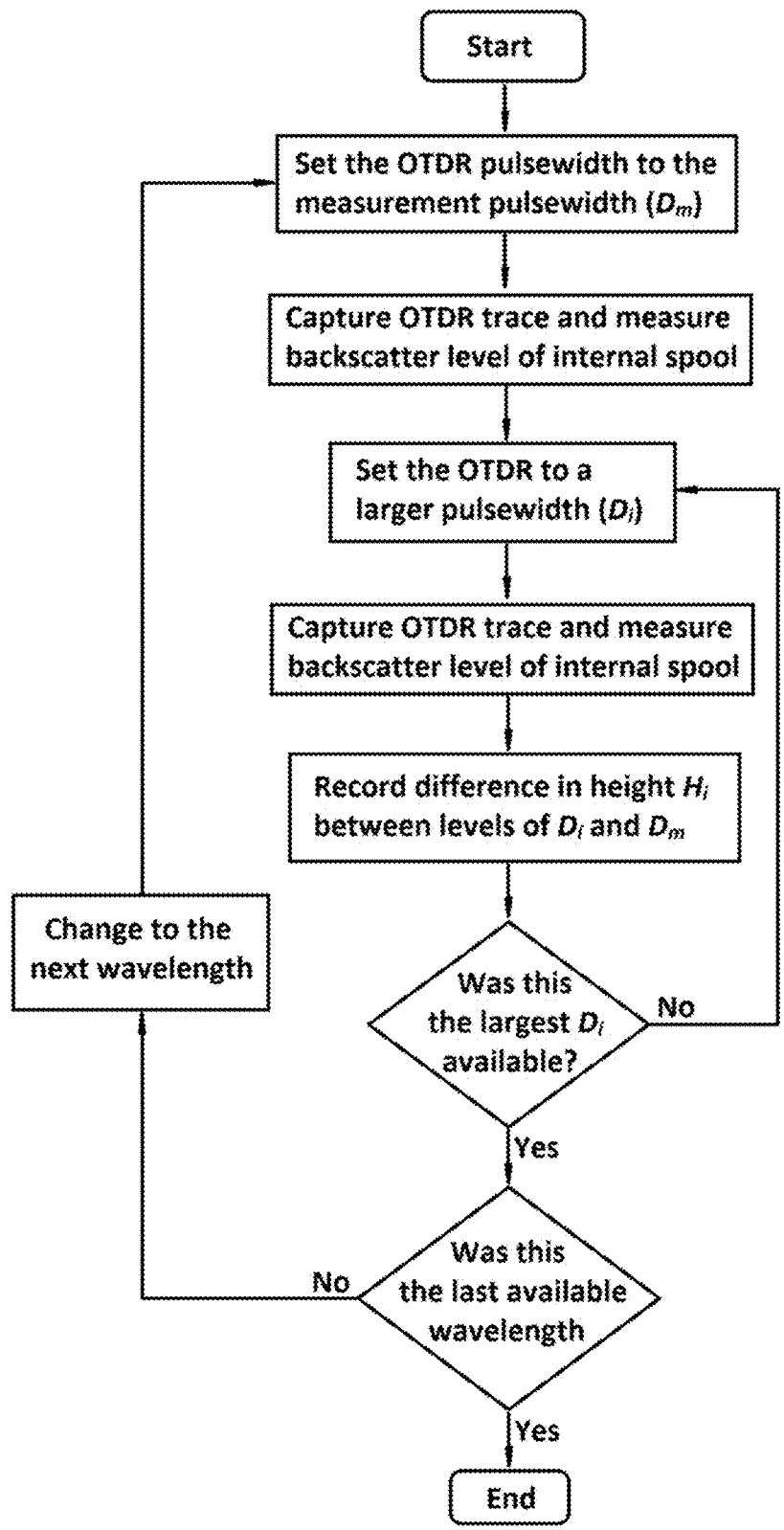
FIG. 3 is a flowchart of the calibration procedure.

The heights $H_i$ represent the excess backscatter produced by the different $D_i$ compared to the backscatter produced by $D_m$ (See FIG. 2 for a graphical representation of this principle). This difference in height represents the amount of backscatter produced by an optical fiber of the same length as the difference in meters between $D_i$ and $D_m$ (grey parts in FIG. 2).

Since pulsewidths are usually measured in ns and not meters, we can simplify the calculations by taking advantage of $B_{ns}(\lambda)$. This quantity represents the backscatter produced by a square 1ns pulse at a wavelength $\lambda$. We now have a way of associating a pulsewidth difference ($D_i$-$D_m$) in ns to an amount of backscatter in dB.

We can now assign the different heights $H_i$ to an amount of backscatter using $D_i$-$D_m$ and the following formula $$B_{s_i}(\lambda) = -10 \cdot \log_{10}\left((D_i - D_m) \cdot 10^{\frac{B_{ns}(\lambda)}{10}}\right) \quad (2)$$

where $B_{s_i}$ is the backscatter produced by a length of fiber equaling the physical width, in meters, of $D_i$-$D_m$. Each height $H_i$ measured from $D_i$-$D_m$ is then associated to a $B_{s_i}$ value representing the RL value of a peak of height H above the injection level. These points allow us to produce a calibration curve associating a peak of height H above the injection level to an RL value.

If $D_i$-$D_m$ is greater than 2 μs, the physical length of the pulse in the fiber is long enough that we need to take into account the loss associated to the optical fiber transmission. The following formula should then be used $$B_{s_i}(\lambda) = 10 \cdot \log_{10}\left(\frac{2\alpha(\lambda) \cdot \Delta x}{1 - e^{-2\alpha(\lambda) \cdot (D_{\Delta x} \cdot (D_i - D_m))}}\right) - B_{ns}(\lambda) \quad (3)$$

where $a(\lambda)$ is the linear attenuation coefficient of the fiber at wavelength $\lambda$ (1/km), $\Delta x$ is 0.0001 km and $D_{\Delta x}$ is 0.0001 km/ns. Eqn. (2) and Eqn. (3) are equivalent for short pulses and can be used interchangeably. Here, short pulses mean anything smaller than 2 μs. These two equations are valid when square pulses are produced. Eqn. (3) is derived from an equation in "Troubleshooting Optical-fiber Networks, Chapter 7, Elsevier Academic Press, $2^{nd}$ edition, 2004".

In the case of a rounded pulse, which can happen for very short pulses, we must calculate the width of a square pulse that would have the same energy as the rounded pulse with a measured full width at half maximum (FWHM). This energy is represented by the area under the curve formed by the pulse when measured in the time domain. The maximum value of the pulse curve is used to normalize its integral. This way, now assuming that the maximum of the curve is the same level as the flat part of an energy equivalent square pulse, the result of the integral gives us the width of that equivalent square pulse. The correction factor is obtained by calculating the ratio of the measured FWHMs and equivalent square pulsewidths. This correction factor needs to be measured for any pulse width that is not square enough to omit it. These steps need to be done for every wavelength available on the OTDR. In the event the OTDR needs to test longer cables where a greater dynamic range is needed, a calibration curve can be produced using a longer pulse as its $D_m$. The internal spool of fiber 14 should be long enough that the entire physical pulse should fit in the length of the spool.

The process of producing multiple backscatter levels only gives us discrete calibrated points. An interpolation function can be used to get RL as function of a height H between those points. For a height H greater than the last (or N) calibration point or smaller than the first calibration point, we use Eqn. (1). However, to ensure that we have a properly adjusted curve (i.e. no discontinuities), we need to offset Eqn. (1) outside of the calibration points. We use the following formula to get the offsets at both ends for a given wavelength:

$$RL_1 = B_{ns} - 10\log_{10}\left(\left(10^{\frac{H_1}{5}} - 1\right)W\right) - \text{Offset}_1 \quad (4)$$

$$\text{Offset}_1 = B_{ns} - 10\log_{10}\left(\left(10^{\frac{H_1}{5}} - 1\right)W\right) - RL_1$$

$$RL_N = B_{ns} - 10\log_{10}\left(\left(10^{\frac{H_N}{5}} - 1\right)W\right) - \text{Offset}_N \quad (5)$$

$$\text{Offset}_N = B_{ns} - 10\log_{10}\left(\left(10^{\frac{H_N}{5}} - 1\right)W\right) - RL_N$$

where 1 represents the first calibration point and N, the last calibration point.

The full calibration curve is:

$$RL(\lambda) = \begin{cases} B_{ns}(\lambda) - 10\log_{10}\left(\left(10^{\frac{H}{5}} - 1\right)W\right) - \text{Offset}_1 & H < H_1 \\ \text{interpolation}_{H_i}(H) & H_1 < H < H_N \\ B_{ns}(\lambda) - 10\log_{10}\left(\left(10^{\frac{H}{5}} - 1\right)W\right) - \text{Offset}_N & H > H_N \end{cases} \quad (6)$$

where $H_1$ is the height of the first calibration point and $H_N$ the height of the last calibration point and interpolation $H_i(H)$ is the interpolated curve produced by $H_i$ of RL as a function of a value H.

In the case that long pulsewidths needing an unreasonably long spool of internal fiber would be required to go through this procedure, it is possible to use an external spool connected directly to the output connector of the OTDR. The loss of the output connector should be kept to a minimum to ensure a proper calibration curve. This method can also be used with short pulses.

The invention claimed is:

1. A method for calibrating a photo-detector response of an optical time domain reflectometer (OTDR) such that peaks obtained from said OTDR trace acquisition are converted into Return Loss values, the method comprising the steps of:
    a) performing an OTDR trace acquisition of a spool of fiber internal to said OTDR using a measurement pulsewidth, $D_m$, and recording the backscattered light level, where m is a positive integer;
    b) performing a plurality of OTDR trace acquisitions as in step a) wherein corresponding pulsewidths, $D_i$, are increasing for each acquisition and recording the backscattered light level for each acquisition, where i is a positive integer;
    c) deriving values for a parameter, $H_i$, by calculating the difference between the backscatter level recorded in step a) and each subsequent backscatter level from step b)
    d) equating the parameter $H_i$ with a corresponding Return Loss value which is equivalent to an amount of backscatter, $B_{s_i}$, that would be produced by a pulse of width $D_i$-$D_m$ using the equation:

$$B_{s_i}(\lambda) = -10 \cdot \log_{10}\left((D_i - D_m) \cdot 10^{\frac{B_{ns}(\lambda)}{10}}\right);$$

where $B_{ns}$ is an intrinsic property of the internal optical fiber equivalent to the backscatter produced in said optical fiber by a square 1ns wide pulse at a wavelength $\lambda$;
    e) interpolating the values found in step d) with a spline function; to create a continuous calibration curve;
    f) repeating steps a) to d) for each wavelength available on said OTDR.

2. The method of claim 1, wherein at least one of the pulsewidths $D_m$ or $D_i$ are greater than 2 μs and further comprising accounting for the loss from the fiber within the length of the pulse when calculating the backscatter in step d) for said pulsewidths greater than 2 μs.

3. The method of claim 1, wherein $H_i$ is greater than or less than any point of the continuous calibration curve and further comprising extending the continuous calibration curve outside of the calibration points determined in step d).

* * * * *